United States Patent
Tsai et al.

(10) Patent No.: US 9,965,668 B2
(45) Date of Patent: May 8, 2018

(54) FINGERPRINT IMAGE ACQUISITION DEVICE

(71) Applicant: KAISTAR Lighting (Xiamen) Co., Ltd, Xiamen (CN)

(72) Inventors: Sheng-Lung Tsai, Xiamen (CN); Steve Meng-Yuan Hong, Xiamen (CN)

(73) Assignee: KAISTAR LIGHTING (XIAMEN) CO., LTD., Xiamen (CN)

( * ) Notice: Subject to any disclaimer, the term of this patent is extended or adjusted under 35 U.S.C. 154(b) by 20 days.

(21) Appl. No.: 15/193,006

(22) Filed: Jun. 25, 2016

(65) Prior Publication Data

US 2017/0161542 A1 Jun. 8, 2017

(30) Foreign Application Priority Data

Dec. 8, 2015 (CN) .......................... 2015 1 0894908

(51) Int. Cl.
*G06K 9/00* (2006.01)
*H04N 5/335* (2011.01)

(52) U.S. Cl.
CPC ........... *G06K 9/0004* (2013.01); *H04N 5/335* (2013.01)

(58) Field of Classification Search
CPC ... G06K 9/0004; G06K 7/10702; H04N 5/335
USPC ........................................................ 382/124
See application file for complete search history.

(56) References Cited

U.S. PATENT DOCUMENTS

| | | | | |
|---|---|---|---|---|
| 5,986,746 A | * | 11/1999 | Metz ................... | A61B 5/1172 356/71 |
| 6,259,108 B1 | * | 7/2001 | Antonelli .......... | G06K 9/00026 250/556 |
| 7,298,362 B2 | * | 11/2007 | Wang .................. | G06F 3/03543 345/156 |
| 8,903,140 B2 | * | 12/2014 | Wu ..................... | G06K 9/00013 382/124 |
| 2004/0252867 A1 | * | 12/2004 | Lan ...................... | G06K 9/0004 382/124 |
| 2013/0229387 A1 | * | 9/2013 | Chen ...................... | G06F 3/042 345/175 |
| 2017/0052384 A1 | * | 2/2017 | Santori ................ | G03H 1/0443 |

* cited by examiner

*Primary Examiner* — Daniel Mariam
(74) *Attorney, Agent, or Firm* — Hemisphere Law, PLLC; Zhigang Ma

(57) ABSTRACT

A fingerprint image acquisition device includes: a light source, a finger touching surface, a convex lens, an image sensor and a grating. The light source is a surface light source, and the grating is disposed on a light output surface of the light source. The light source is configured to emit a light beam, the grating is configured to change a propagation direction of the light beam to form a detection light beam, the finger touching surface is configured for a user to place a finger thereon to reflect the detection light beam and thereby obtain a reflected light beam, the convex lens is configured to focus the reflected light beam on the image sensor, and the image sensor is configured to generate a fingerprint image based on the focused reflected light beam. Accordingly, the invention can make the structure of the fingerprint image acquisition device be more compact.

13 Claims, 4 Drawing Sheets

FINGERPRINT IMAGE ACQUISITION DEVICE

FIELD OF THE INVENTION

The invention relates to a fingerprint acquisition technical field, and more particularly to a fingerprint image acquisition device.

BACKGROUND OF THE INVENTION

Referring to FIG. 1, it is a structural principle diagram of a conventional fingerprint image acquisition device. Specifically, the fingerprint image acquisition device shown in FIG. 1 includes: a light source 12, a prism 14, a convex lens 16 and an image sensor 18. The prism 14 has a contacting surface for a finger 10. A light beam from the light source 12 enters into the prism 14 through a side of the prism 14, the light beam in the prism 14 moves towards the contacting surface for the finger 10 and is reflected to another side of the prism 14 by a fingerprint image of the finger 10; after that the light beam is focused on the image sensor 18 by going through the convex lens 16, then an appropriate signal processing is performed so as to achieve fingerprint recognition.

However, as the light source 12, the convex lens 16 and the image sensor 18 are located at different sides of the prism 14, a space just below the finger contacting surface of the prism 14 cannot be utilized, as a result, a volume of the fingerprint image acquisition device cannot be decreased.

SUMMARY OF THE INVENTION

Therefore, an objective of the invention is to provide a subminiature fingerprint image acquisition device, which can be applied in an electronic product like a mobile phone or a camera.

Specifically, a fingerprint image acquisition device according to an embodiment of the invention includes: a light source, a finger contacting surface, a convex lens, an image sensor and a grating. The light source is a surface light source, and the grating is disposed on a light output surface of the surface light source. Moreover, the surface light source is configured (i.e., structured and arranged) to emit a light beam, the grating is configured to change a propagation direction of the light beam to thereby form a detection light beam, the finger touching surface is configured for a user to place a finger thereon to reflect the detection light beam and thereby obtain a reflected light beam, the convex lens is configured to focus the reflected light beam on the image sensor, and the image sensor is configured to generate a fingerprint image based on the focused reflected light beam.

In an embodiment of the invention, the fingerprint image acquisition device further includes a casing and a transparent plate, a through-hole is defined on the top of the case to accommodate the transparent plate therein, an external surface of the transparent plate acts as the finger touching surface, the surface light source is fixed on a sidewall of the casing, the convex lens and the image sensor are disposed spaced from each other and located just below the transparent plate.

In an embodiment of the invention, the fingerprint image acquisition device further includes a circuit board, the circuit board is connected to a bottom of the casing, the image sensor is disposed on the circuit board.

In an embodiment of the invention, the fingerprint image acquisition device further includes a casing and a transparent plate, a through-hole is defined on the top of the casing to accommodate the transparent plate therein, an external surface of the transparent plate is functioned as the finger touching surface, the surface light source is disposed rightly below the transparent plate, the convex lens and the image sensor are disposed spaced from each other and located just below the transparent plate.

In an embodiment of the invention, the fingerprint image acquisition device further includes a circuit board, the circuit board is connected with a bottom of the casing, the image sensor and the area light source are spacedly disposed on the circuit board.

In an embodiment of the invention, the transparent plate is a glass plate.

In an embodiment of the invention, the grating is attached on a light output surface of the surface light source.

In an embodiment of the invention, the grating is a slit grating.

In an embodiment of the invention, the surface light source is an OLED array.

Furthermore, a fingerprint image acquisition device according to another embodiment of the invention includes: a light source, a finger touching surface, a convex lens, an image sensor, a casing and a light beam deflection component. The light source is a surface light source, the light beam deflection component is attached on a light output surface of the surface light source, the finger touching surface is disposed on the top of the casing, the convex lens and the image sensor are disposed rightly below the finger touching surface, and the convex lens is disposed between the finger touching surface and the image sensor. The surface light source is fixed on a sidewall of the casing, or the surface light source is disposed rightly below the finger touching surface and spaced from the image sensor.

Sum up, the invention disposes a light beam deflection component such as a grating on the light output surface of the surface light source to change the propagation direction of the light beam emitted from the surface light source, so that a distance between the light source and the convex lens as well as the image sensor can be decreased in design, the structure of the fingerprint image acquisition device is accordingly more compact and the purpose of reducing the volume of fingerprint image acquisition device can be achieved.

By the following detailed description with reference to accompanying drawings, other aspects and features of the invention will become apparent. However, it should be understood that, the drawings only are for the purpose of explanation and not as limiting the scope of the invention, and the scope of the invention should refer to the appended claims. It also be appreciated that, unless otherwise indicated, the drawings are not necessarily drawn to scale, they are merely trying to conceptually illustrate the structures and procedures described herein.

BRIEF DESCRIPTION OF THE DRAWINGS

In the following, with reference to accompanying drawings, concrete embodiments of the invention will be described in detail.

DETAILED DESCRIPTION OF PREFERRED EMBODIMENTS

Embodiments of the invention are described in detail with reference to the accompanying drawings as follows to better understand the objectives, features and advantages of the invention.

First Exemplary Embodiment

Figure 1:
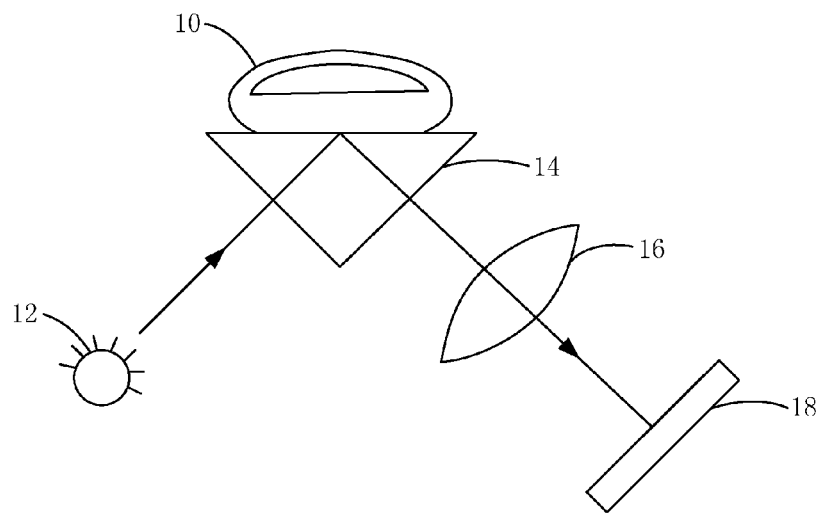
FIG. 1 is a structural principal schematic view of a conventional fingerprint image acquisition device.
Figure 2:
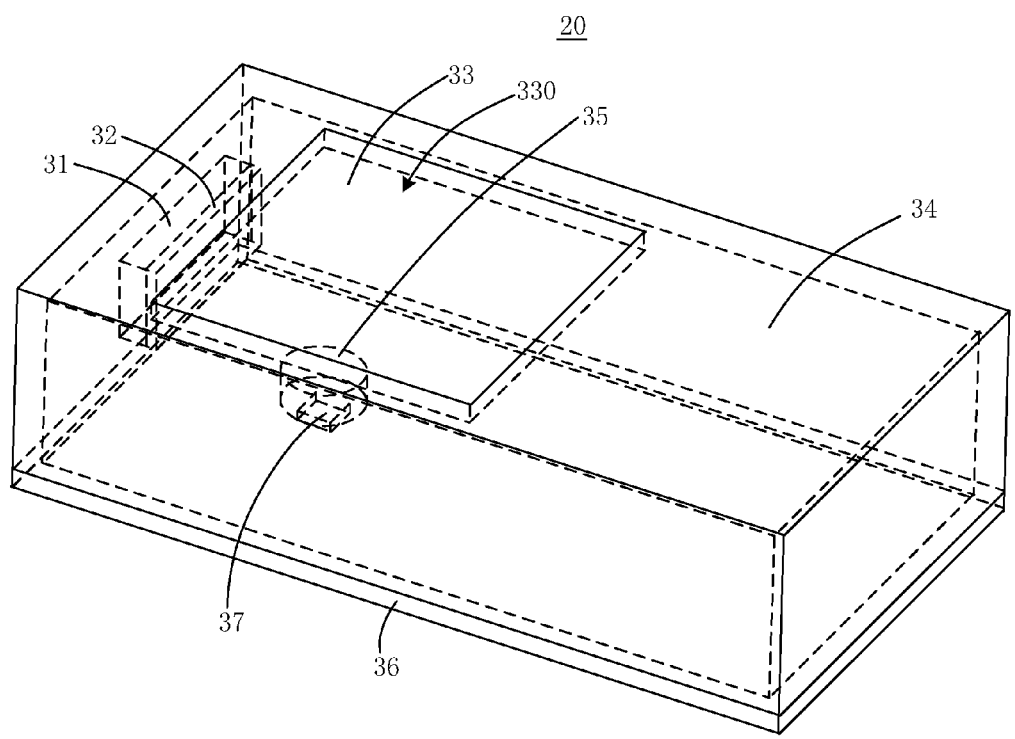
FIG. 2 is a perspective structural schematic view of a fingerprint image acquisition device according to a first embodiment of the invention.
Figure 3:
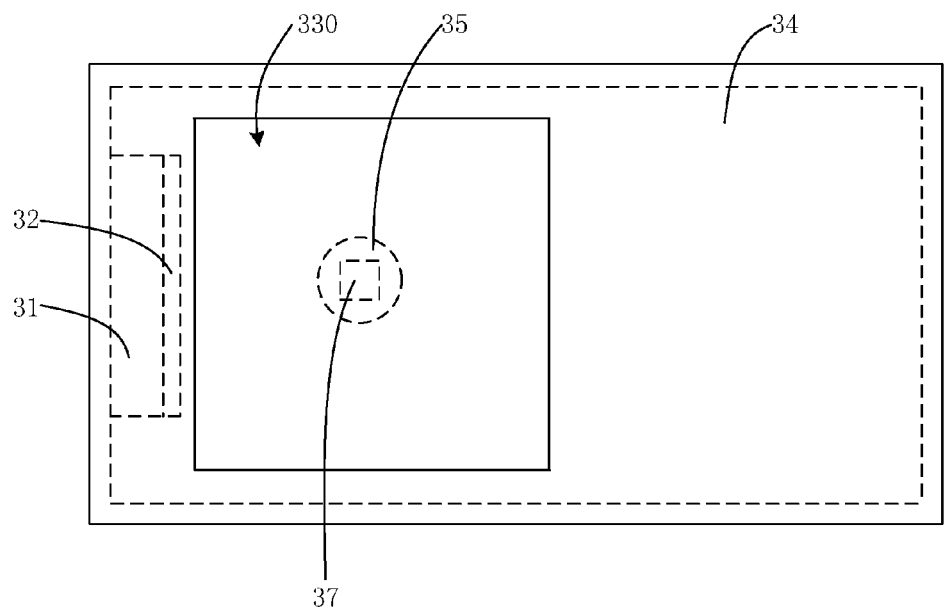
FIG. 3 is a top view of the fingerprint image acquisition device shown in FIG. 2.
Figure 4:
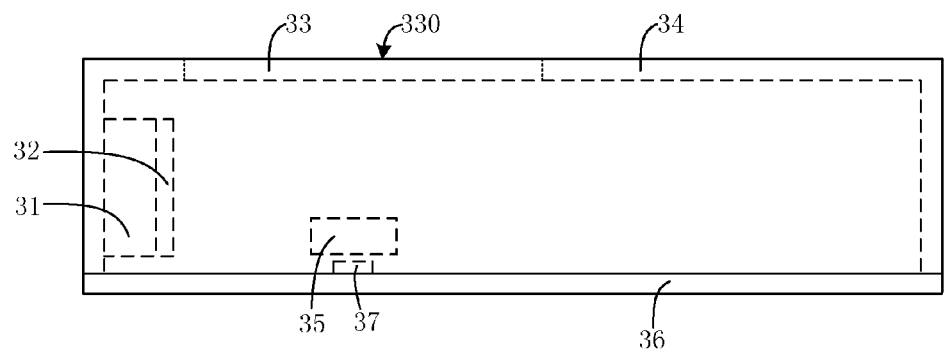
FIG. 4 is a front view of the fingerprint image acquisition device shown in FIG. 2.
Figure 5:
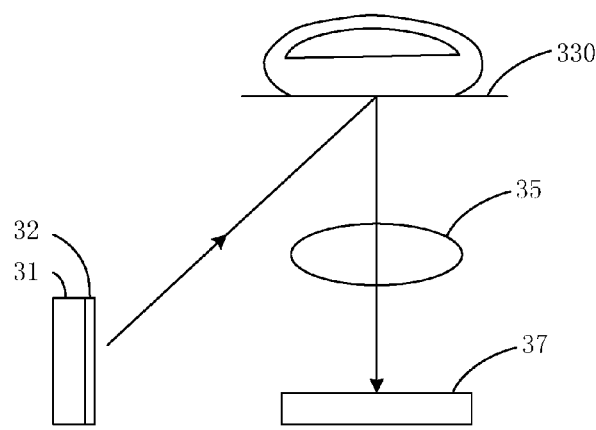
FIG. 5 is a structural principal schematic view of the fingerprint image acquisition device according to the first embodiment of the invention.

Referring to FIG. 2 through FIG. 5, FIG. 2 is a perspective structural schematic view of a fingerprint image acquisition device according to a first embodiment of the invention, FIG. 3 is a top view of the fingerprint image acquisition device shown in FIG. 2, FIG. 4 is a front view of the fingerprint image acquisition device shown in FIG. 2, and FIG. 5 is a structural principal schematic view of the fingerprint image acquisition device according to the first embodiment of the invention.

Specifically, the fingerprint image acquisition device 30 of the present embodiment includes: a surface light source 31, a grating 32, a transparent plate 33, a casing 34, a convex lens 35, a circuit board 36 and an image sensor 37.

A through-hole (not labelled in the figures) is defined on the top of the casing 34. The transparent plate 33 is accommodated in the through-hole and an external surface 330 of the transparent plate 33 acts as a finger touching surface for a user to lay a finger thereon. In the illustrated embodiment, the transparent plate 33 for example is a glass plate. The surface light source 31 is fixed on a sidewall of the casing 34 as the light source. Typically, the surface light source is an organic light emitting diode (OLED) component including a transparent base such as a glass base and an indium tin oxide (ITO) anode, a hole transport layer, a light emitting layer, an electron transport layer and a metal cathode sequentially overlapped on the transparent base in that order, an external surface of the surface light source 31, i.e., a surface at a side of the transparent base away from the ITO anode is as its light output surface. Preferably, the surface light source 31 is an OLED array. The grating 32 is a light beam deflection component, which for example is a slit grating and disposed on the light output surface of the surface light source 31. The grating 32 for example is disposed on the light output surface by surface attachment, or is attached onto the light output surface by an optically clear adhesive (OCA) instead. It is noted herein that attaching the grating 32 on the light output surface of the surface light source 31 is in favor of alignment therebetween and thereby facilitates for precise control of light beam deflection direction. The circuit board 36 is connected to a bottom of the casing 34. The image sensor 37 is disposed on the circuit board 36 and located just below the transparent plate 33. The convex lens 35 is disposed between the transparent plate 33 and the image sensor 37 and located directly below the transparent plate 33. In the illustrated embodiment, the grating 32 is disposed on the light output surface of the surface light source 31 and can be formed by nanoimprint or sintering together with the formation of the transparent substrate directly. As the grating 32 is formed on the surface light source 31 such as the OLED component directly, a precise alignment between the light source and the grating 32 for changing propagation direction of light beam is no longer required, and therefore production and assembly costs can be significantly reduced.

In FIG. 5, a light beam emitted from the surface light source 31 is changed with its propagation direction by the grating 32 to thereby form a detection light beam and then strikes on an external surface 330 of the transparent plate 33, i.e., the finger touching surface, after that the detection light beam is reflected at the finger touching surface by a finger to form a reflected light beam, the reflected light beam subsequently is focused onto the image sensor 37 by the convex lens 35, the image sensor 37 finally generates a fingerprint image according to the received focused reflected light beam.

Second Exemplary Embodiment

Figure 6:
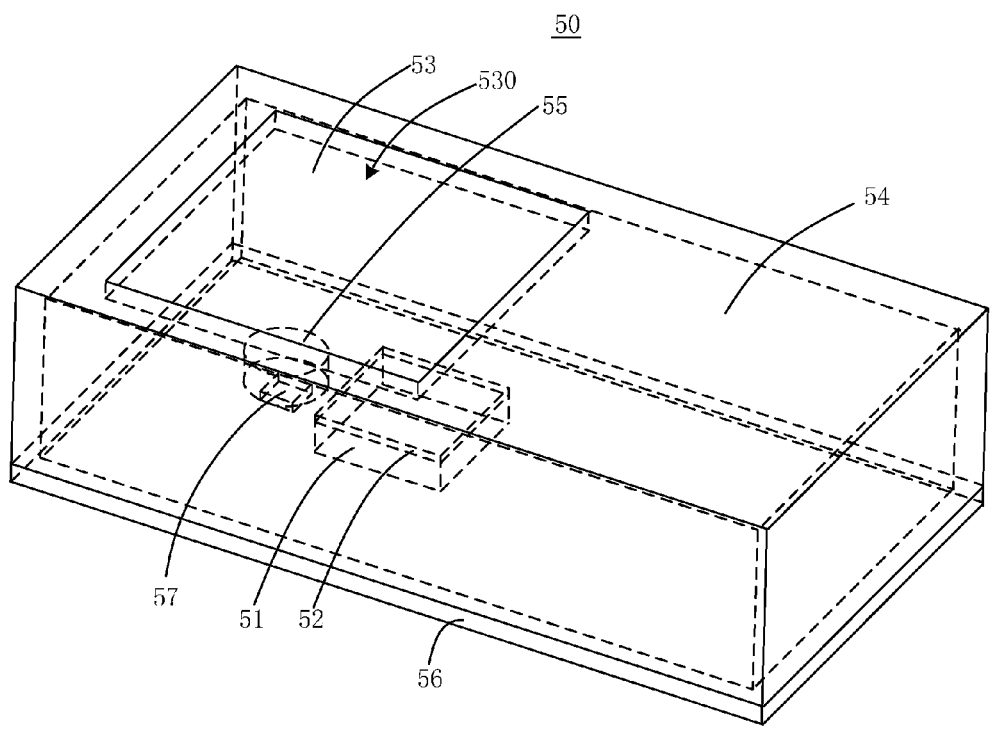
FIG. 6 is a perspective structural schematic view of a fingerprint image acquisition device according to a second embodiment of the invention.
Figure 7:
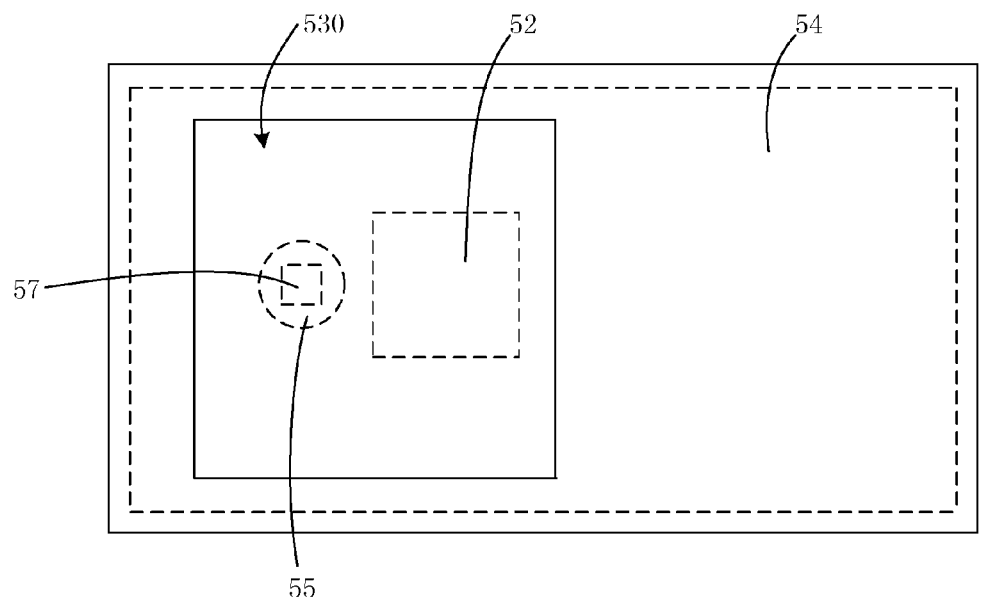
FIG. 7 is a top view of the fingerprint image acquisition device shown in FIG. 6.
Figure 8:
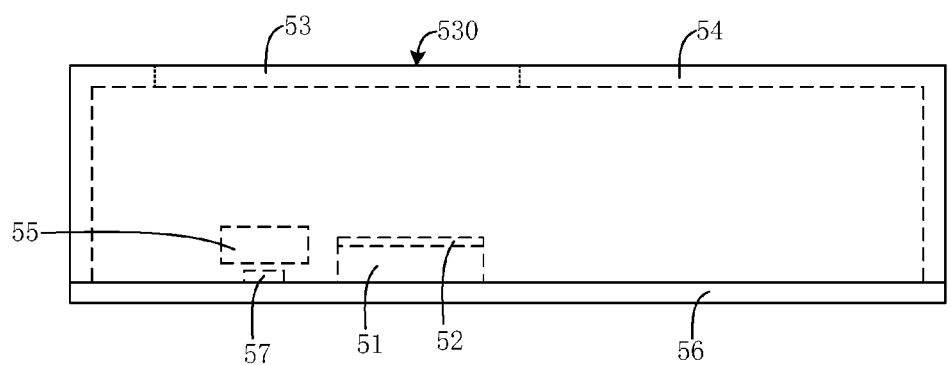
FIG. 8 is a front view of the fingerprint image acquisition device shown in FIG. 6.

Referring to FIG. 6 through FIG. 8, FIG. 6 is a perspective structural schematic view of a fingerprint image acquisition device according to a second embodiment of the invention, FIG. 7 is a top view of the fingerprint image acquisition device shown in FIG. 6, and FIG. 8 is a front view of the fingerprint image acquisition device shown in FIG. 6.

Specifically, the fingerprint image acquisition device 50 of the illustrated embodiment includes: a surface light source 51, a grating 52, a transparent plate 53, a casing 54, a convex lens 55, a circuit board 56 and an image sensor 57.

A through-hole (not labelled in the figures) is defined on the top of the casing 54. The transparent plate 53 is disposed in the through-hole and an external surface 530 of the transparent plate 53 acts as a finger touching surface for a user to lay a finger thereon. In the illustrated embodiment, the transparent plate for example is a glass plate. The surface light source 51 is disposed on the circuit board 56 as a light source and located directly below the transparent plate 53. Typically, the surface light source 51 is an OLED component including a transparent base such as a glass base and an ITO anode, a hole transport layer, a light emitting layer, an electron transport layer and a metal cathode sequentially overlapped on the glass base in that order. An external surface of the surface light source 51, i.e., a surface at a side of the transparent base away from the ITO anode is as its light output surface. Preferably, the surface light source 51 is an OLED array. The grating 52 is a light beam deflection component, which for example is a slit grating disposed on the light output surface of the surface light source 51. The grating 52 for example is disposed on the light output surface by surface attachment or is attached onto the light output surface of the surface light source 51 by an optically clear adhesive. It is indicated herein that attaching the grating 52 on the light output surface of the surface light source 51 is in favor of precise alignment between the grating 52 and the surface light source 51, and thereby facilitates the precise control of light beam deflection direction. The circuit board 56 is connected to a bottom of the casing 54. The image sensor 57 and the surface light source 51 are spacedly disposed on the circuit board 56 and both are further located directly below the transparent plate 53. The convex lens 55 is disposed between the transparent plate 53 and the image sensor 57 and located directly below the transparent plate 53. In the illustrated embodiment, the grating 52 is disposed on the light output surface of the surface light source 51 and can be formed by nanoimprint or sintering together with the formation of the transparent substrate. As the grating 52 is formed on the surface light source 51 such as the OLED component directly, an exact alignment between the light source and the grating 52 for changing propagation direction of light beam is not required any more, as a result, production and assembly costs can be reduced significantly. With regard to the working principle of the fingerprint image acquisition device 50 shown in FIG. 6 through FIG. 8, it can be referred to FIG. 5, and a difference of the two embodiments mainly is the setting positions of the combined structures of surface light source and grating.

In summary, the various embodiments of the invention each dispose a light beam deflection component such as a grating onto the light output surface of the surface light source so as to change the propagation direction of the light beam emitted from the surface light source, so that a distance between the light source and the convex lens as well as the image sensor can be decreased in design, the structure of the fingerprint image acquisition device is accordingly more compact and the purpose of reducing the volume of fingerprint image acquisition device can be achieved.

The above description illustrates various exemplary embodiments to explain the invention, and the foregoing exemplary embodiments only are used to help understand the solution of the invention and its core idea. For those skilled persons in the art, various modifications and variations can be made according to the concept of the invention, and therefore the invention needs not be limited to the disclosed embodiments. It is intended to cover various modifications and similar arrangements included within the spirit and scope of the appended claims which are to be accorded with the broadest interpretation so as to encompass all such modifications and similar structures.

What is claimed is:

1. A fingerprint image acquisition device comprising: a light source, a finger touching surface, a convex lens and an image sensor; wherein the light source is a surface light source, the fingerprint image acquisition device further comprises a grating; the surface light source is configured to emit a light beam, the finger touching surface is configured to facilitate a user to place a finger thereon to reflect the light beam, the convex lens is configured to focus the reflected light beam on the image sensor, and the image sensor is configured to generate a fingerprint image based on the focused reflected light beam;

wherein the grating is attached onto a light output surface of the surface light source by an adhesive or is immediately formed on the light output surface of the surface light source, the surface light source is a self-luminous surface light source and an external surface of the surface light source is the light output surface; the light beam emitted from the surface light source first is redirected to the finger touching surface by the grating, and then reflected to the convex lens by the finger touching surface; the light beam reflected by the finger touching surface directly passes through the convex lens without penetrating the grating anew.

2. The fingerprint image acquisition device according to claim 1, wherein the fingerprint image acquisition device further comprises a casing and a transparent plate, a through-hole is defined on top of the casing to accommodate the transparent plate therein, an external surface of the transparent plate acts as the finger touching surface, the surface light source is fixed on a sidewall of the casing, the convex lens and the image sensor are disposed spaced from each other and located just below the transparent plate.

3. The fingerprint image acquisition device according to claim 2, wherein the fingerprint image acquisition device further comprises a circuit board, the circuit board is connected with a bottom of the casing, the image sensor is disposed on the circuit board.

4. The fingerprint image acquisition device according to claim 2, wherein the transparent plate is a glass plate.

5. The fingerprint image acquisition device according to claim 1, wherein the fingerprint image acquisition device further comprises a casing and a transparent plate, a through-hole is defined on the top of the casing to accommodate the transparent plate therein, an external surface of the transparent plate functions as the finger touching surface, the surface light source is disposed directly below the transparent plate, the convex lens and the image sensor are disposed spaced from each other and located directly below the transparent plate.

6. The fingerprint image acquisition device according to claim 5, wherein the fingerprint image acquisition device further comprises a circuit board, the circuit board is connected with a bottom of the casing, the image sensor and the surface light source are spacedly disposed on the circuit board.

7. The fingerprint image acquisition device according to claim 5, wherein the transparent plate is a glass plate.

8. The fingerprint image acquisition device according to claim 1, wherein the grating is a slit grating.

9. The fingerprint image acquisition device according to claim 1, wherein the surface light source is an organic light emitting diode (OLED) array.

10. A fingerprint image acquisition device comprising: a light source, a finger touching surface, a convex lens and an image sensor; wherein the light source is a surface light source, and the fingerprint image acquisition device further comprises a casing and a light beam deflection component; the light beam deflection component is attached on a light output surface of the surface light source by an adhesive or is immediately formed on the light output surface of the surface light source, the finger touching surface is located on the top of the casing, the convex lens and the image sensor are disposed directly below the finger touching surface, the convex lens is disposed between the finger touching surface and the image sensor; the surface light source is fixed on a sidewall of the casing, or the surface light source is disposed directly below the finger touching surface and spaced from the image sensor; the surface light source is a self-luminous surface light source and the light output surface is connected with the surface light source; a light beam emitted from the surface light source first is redirected to the finger touching surface by the light beam deflection component, and then reflected to the convex lens by the finger touching surface; the light beam reflected by the finger touching surface directly passes through the convex lens without penetrating the light beam deflection component anew.

11. A fingerprint image acquisition device comprising: a light source, a finger touching surface, a convex lens and an image sensor; wherein the light source is a surface light source, the fingerprint image acquisition device further comprises a grating disposed on a light output surface of the surface light source; the surface light source is configured to emit a light beam, the grating is configured to change a propagation direction of the light beam to thereby form a detection light beam, the finger touching surface is configured to facilitate a user to place a finger thereon to reflect the detection light beam and thereby obtain a reflected light beam, the convex lens is configured to focus the reflected light beam on the image sensor, and the image sensor is configured to generate a fingerprint image based on the focused reflected light beam;

wherein the surface light source is an organic light emitting diode array, the organic light emitting diode array comprises a transparent base, and an indium tin oxide anode, a hole transport layer, a light emitting layer, an electron transport layer and a metal cathode sequentially overlapped on the transparent base in that order; the grating is immediately formed on an external surface of the transparent base, and the external surface is used as the light output surface of the surface light source.

12. The fingerprint image acquisition device according to claim 11, wherein the light beam emitted from the surface light source first is redirected to the finger touching surface by the grating, and then reflected to the convex lens by the finger touching surface; the light beam reflected by the finger touching surface directly passes through the convex lens without penetrating the grating anew.

13. The fingerprint image acquisition device according to claim 11, wherein the grating is immediately formed on the external surface of the transparent base by nanoimprint or sintering.

* * * * *